(12) United States Patent
Lisiak

(10) Patent No.: US 11,079,292 B2
(45) Date of Patent: Aug. 3, 2021

(54) GUIDE JACKET FORCE SENSOR

(71) Applicant: FUTEK Advanced Sensor Technology, Irvine, CA (US)

(72) Inventor: Maciej Lisiak, San Clemente, CA (US)

(73) Assignee: FUTEK Advanced Sensor Technology, Inc., Irvine, CA (US)

( * ) Notice: Subject to any disclaimer, the term of this patent is extended or adjusted under 35 U.S.C. 154(b) by 0 days.

(21) Appl. No.: 16/601,770

(22) Filed: Oct. 15, 2019

(65) Prior Publication Data
US 2021/0108976 A1 Apr. 15, 2021

(51) Int. Cl.
*G01L 5/10* (2020.01)
*G01L 5/102* (2020.01)
*G01L 1/22* (2006.01)

(52) U.S. Cl.
CPC ............ *G01L 5/102* (2013.01); *G01L 1/2262* (2013.01); *G01L 1/2287* (2013.01)

(58) Field of Classification Search
CPC .................. G01L 5/04–108; G01L 1/2218
See application file for complete search history.

(56) References Cited

U.S. PATENT DOCUMENTS

| | | | | |
|---|---|---|---|---|
| 3,004,231 A | * | 10/1961 | Laimins ................ | G01L 1/2218 338/5 |
| 3,261,204 A | * | 7/1966 | Jacobson .............. | G01L 1/2225 73/862.627 |
| 3,376,537 A | * | 4/1968 | Pugnaire ............... | G01L 1/2218 338/5 |
| 3,381,527 A | | 5/1968 | Grubbs | |
| 3,662,596 A | * | 5/1972 | Siefert .................. | G01L 1/2218 73/862.392 |
| 3,866,473 A | * | 2/1975 | Teitelbaum .......... | G01L 9/0002 73/726 |
| 3,969,935 A | * | 7/1976 | Shoberg ............... | G01L 1/2218 73/862.629 |
| 4,402,229 A | * | 9/1983 | Byrne .................... | G01L 5/102 73/862.392 |
| 4,423,793 A | * | 1/1984 | Caris .................... | G01L 1/2218 177/211 |
| 4,789,035 A | * | 12/1988 | Hamilton ............. | G01G 3/1408 177/211 |
| 4,803,888 A | | 2/1989 | Choquet | |
| 4,833,927 A | | 5/1989 | Park | |
| 4,840,521 A | * | 6/1989 | Bonnet ................. | F16L 23/036 73/862.641 |
| 4,899,599 A | * | 2/1990 | Eddens ................ | G01L 1/2243 73/862.382 |
| 4,989,450 A | | 2/1991 | Shoberg et al. | |
| 5,052,233 A | | 10/1991 | Rantala | |

(Continued)

*Primary Examiner* — Tran M. Tran
(74) *Attorney, Agent, or Firm* — Young Basile Hanlon & MacFarlane, P.C.

(57) ABSTRACT

A load sensor is designed to be mounted on a continuous force-applying medium such as a cable so as to deform according to the force transmitted through the medium. The sensor includes a body having a longitudinal through-passage for the medium and is mechanically secured to the medium only at the opposite ends of the body. A lateral hole provides a strain concentration area with zones that are instrumented with strain gages. The sensor body can be enclosed to provide support for a wrap-around lead carrier.

6 Claims, 14 Drawing Sheets

(56) References Cited

U.S. PATENT DOCUMENTS

| | | | | |
|---|---|---|---|---|
| 5,220,971 | A * | 6/1993 | Farr | G01G 3/1412 177/211 |
| 5,230,252 | A * | 7/1993 | O'Brien | G01B 7/18 73/862.637 |
| 5,925,832 | A * | 7/1999 | Bruns | G01L 1/048 73/862.632 |
| 5,929,390 | A * | 7/1999 | Naito | G01G 3/1412 73/862.634 |
| 6,311,564 | B1 * | 11/2001 | Martin | G01B 7/18 73/787 |
| 6,684,487 | B2 * | 2/2004 | Naito | G01L 1/2287 29/621.1 |
| 7,155,348 | B2 * | 12/2006 | Loher | G01G 3/18 702/41 |
| 7,241,956 | B1 * | 7/2007 | Stimpson | G01G 19/08 177/136 |
| 7,424,832 | B1 | 9/2008 | Nunnelee | |
| 8,024,980 | B2 * | 9/2011 | Arms | G01L 1/2225 73/761 |
| 8,056,423 | B2 * | 11/2011 | Abdallah | B25J 9/1045 73/826 |
| 8,474,331 | B2 * | 7/2013 | Pekin | G01G 19/60 73/862.474 |
| 8,621,939 | B2 * | 1/2014 | Blumenkranz | A61B 34/71 73/862.046 |
| RE45,883 | E * | 2/2016 | Ohbayashi | B65H 45/12 |
| 9,464,949 | B2 | 10/2016 | Mahlen et al. | |
| 9,527,694 | B2 * | 12/2016 | Barea | H01F 41/094 |
| 9,791,332 | B2 * | 10/2017 | Jaeger | G01G 3/1408 |
| 10,302,510 | B2 * | 5/2019 | Baker | F04B 47/02 |
| 10,596,346 | B2 * | 3/2020 | Aeby | A61B 90/06 |
| 10,663,359 | B2 * | 5/2020 | Zach | G01G 3/14 |
| 10,765,428 | B2 * | 9/2020 | Sgroi, Jr. | A61B 17/3494 |
| 2011/0088489 | A1 * | 4/2011 | Yamamoto | G01L 5/161 73/862.627 |
| 2011/0259110 | A1 * | 10/2011 | Smith | G01B 3/18 73/760 |
| 2014/0041458 | A1 * | 2/2014 | Smith | G01B 7/16 73/856 |

* cited by examiner

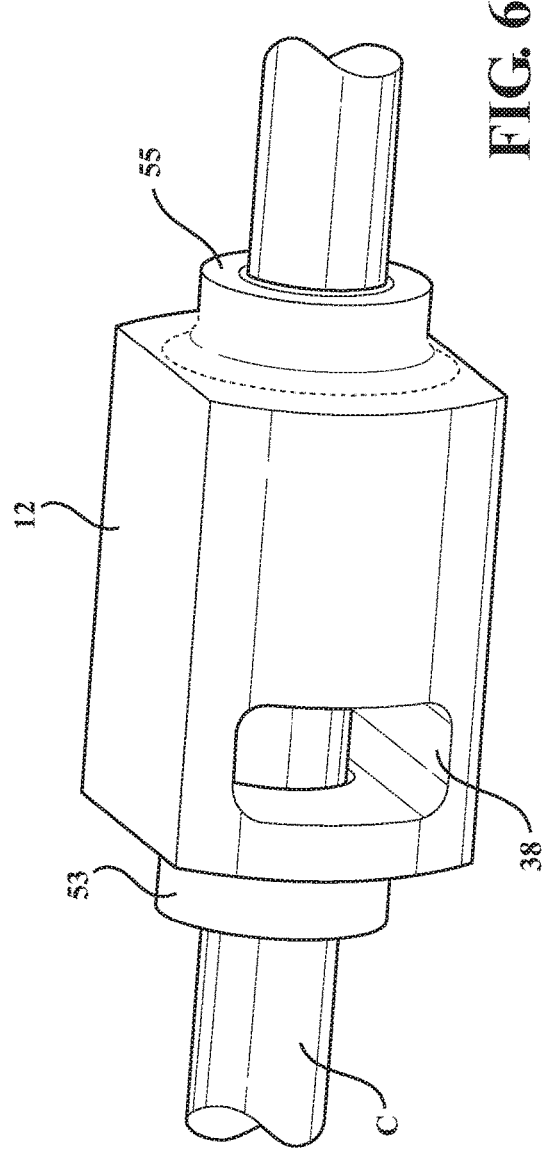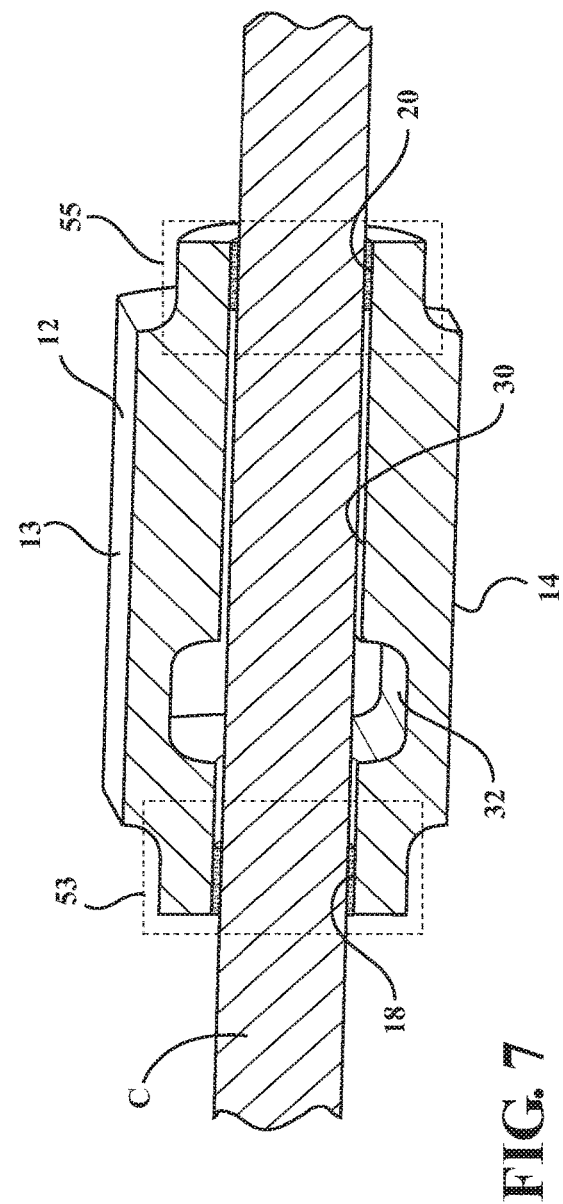

GUIDE JACKET FORCE SENSOR

FIELD OF THE INVENTION

This invention is in the field of force sensors and, in particular, sensors of the type used to measure tension and/or compression forces transmitted through a linear medium such as a cable, ferrule, arm, wire, shaft, rod, rope or the like subject to some degree of elastic linear deformation under load. For simplicity, the term "linear medium" is used herein as a generic term for all such alternatives.

BACKGROUND OF THE INVENTION

It is known to use tensiometers to measure static tension in a linear medium such as a wire or cable. A tensiometer may be constructed with a frame adapted to hang on the cable or wire. The frame carries two spaced rollers that contact the cable or wire. An adjustable element on the frame between the rollers is used to apply a lateral force to the cable or wire, causing it to bend out of a straight path between the rollers. See U.S. Pat. No. 7,424,832 to Nunnelee. A further example of a tensiometer is shown in U.S. Pat. No. 4,989,450 to Shoberg.

A different approach generally used to measure tension or compression loads in a dynamic fashion involves the installation of a sensor as a mechanical link directly in the force-transmitting medium by interrupting the medium and attaching the sensor in such a way as to re-join the two resulting lengths so that load forces must pass through the sensor. The disadvantage of this approach is that a catastrophic failure of the sensor or its attachment to the medium interrupts operation of the entire system.

SUMMARY OF THE DISCLOSURE

As disclosed herein a force sensor is attached to a linear medium without the need to interrupt, bend or otherwise alter the medium. This is accomplished by providing an instrumented flexure body with a longitudinal passage that allows the medium to pass uninterrupted through the body, and firmly affixing the flexure body to the medium at two spaced points along the passage, preferably at the opposite ends of the flexure. In this fashion, a portion of the flexure body is elastically deformed when the medium stretches or compresses under load. The flexure body is strategically configured as hereinafter described to provide a strain-concentration area between the ends that can deform in one or both of tension and compression modes. This area can be instrumented such as by bonded-in-place strain gages or similar devices to produce electrical outputs correlated to the force being transmitted through the medium. Various modes of instrumentation are hereinafter described.

In the illustrated embodiments hereinafter shown and described in detail, the flexure body is made of a high modulus of elasticity material such as stainless steel, aluminum or Inconel. The flexure body has a longitudinal passage that accepts the medium fully through it. Adhesives and/or other means are used to affix the flexure body to the medium only at or near the flexure body ends. The flexure body is further configured, for example by means of a second aperture or hole which passes laterally through the body and orthogonally intersects the longitudinal passage, to create the afore-mentioned stress-concentration area. The flexure body has top and bottom flat surfaces and strain gages are attached by bonding to one or more of these surfaces along with contact pads so that the gages can be connected in, for example, a Wheatstone bridge circuit directly on the device. The bridge circuit can be connected externally to a power source and/or a display or other signal processor through conductive leads in various ways; a specific lead arrangement that provides strain relief being hereinafter described.

Further in accordance with an illustrative embodiment, the flexure body is partially enclosed or "jacketed" to provide a wrap-around surface for a conductive lead carrier as well as clearances for the carrier as it passes around and away from the flexure body. The enclosure can lend both aesthetic and functional characteristics to the device.

The device described herein lends itself to miniaturization for use in fields such as surgical robotics where precise control of remotely-operated instruments during a surgical procedure is of the utmost importance.

BRIEF DESCRIPTION OF THE DRAWINGS

Illustrative embodiments are hereinafter described in accordance with 35 U.S.C. § 112 and these descriptions are to be taken with the accompanying drawings in which:

FIGS. 6 and 7 show portions of a first mechanism for attaching the sensor to a cable or rod medium;

DETAILED DESCRIPTION OF THE ILLUSTRATIVE EMBODIMENTS

Single-Sided Embodiment

Figure 1:
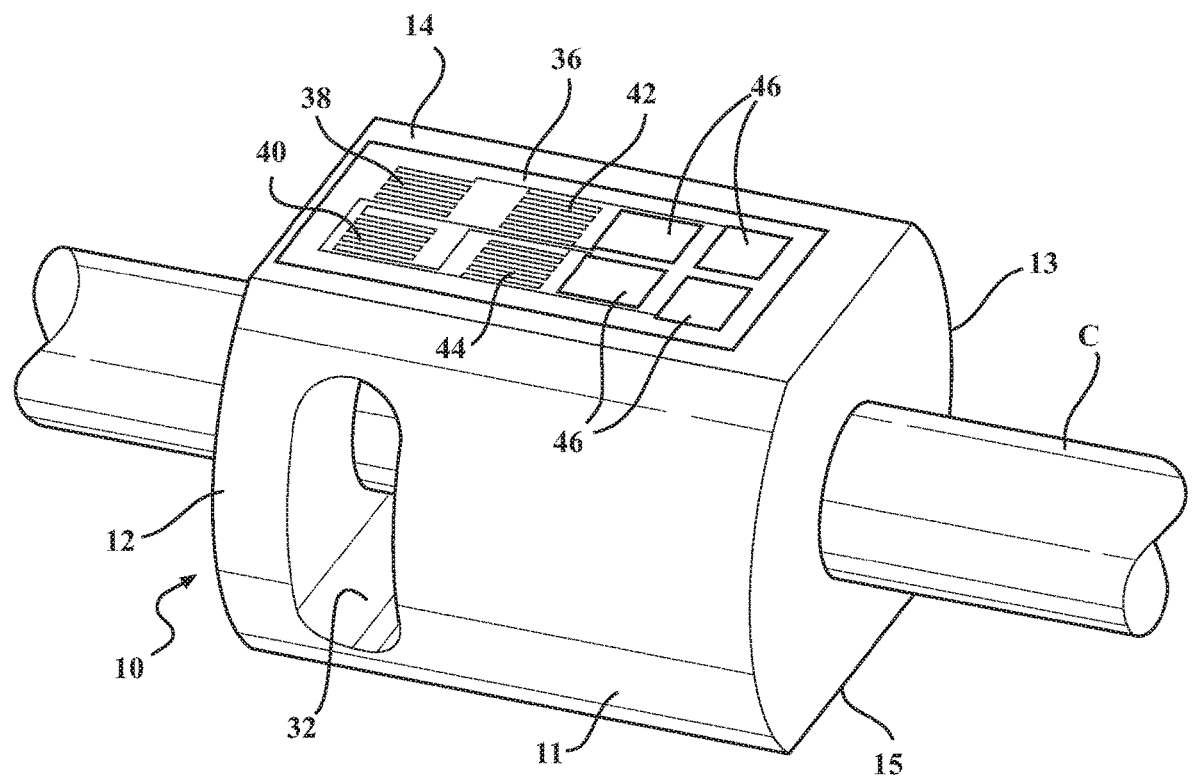
FIG. 1 is a perspective drawing of an instrumented flexure body installed on a rod-like force-transmitting medium.
Figure 2:
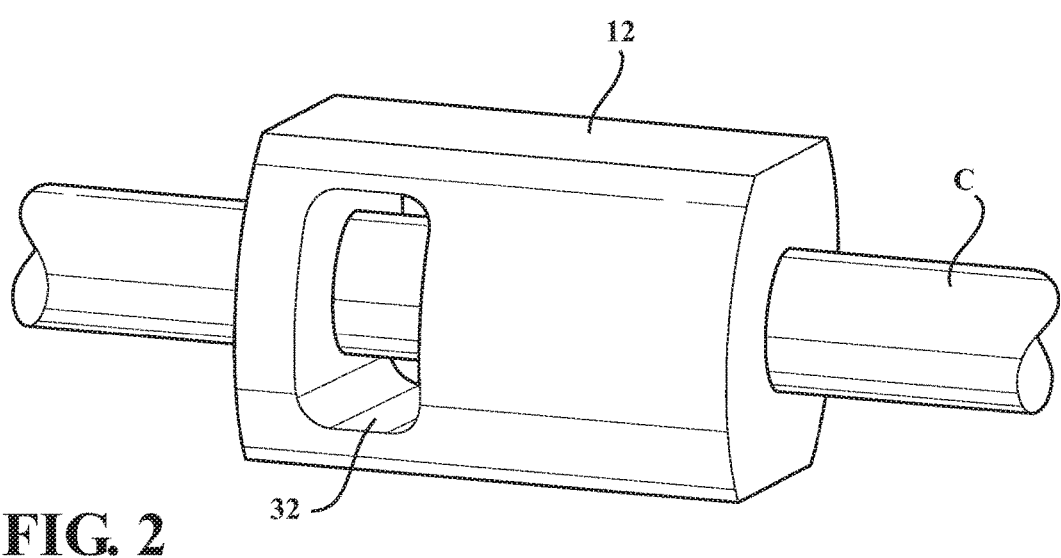
FIG. 2 is a perspective view of a flexure body with a variation in configuration.

Referring to the drawings, FIG. 1 shows a force sensor 10 comprising a solid flexure body 12 of an elastically deformable material having a high modulus of elasticity such as stainless steel, aluminum or Inconel. The flexure body is configured with rounded sides 11, 13 and flat, parallel top and bottom surfaces 14 and 15. Either or both of the flat surfaces 14, 15 provide mounting locations for instrumentation elements including solder pads 46 and variable resistance strain gages 38, 40, 42, and 44, all of which are insulated from electrical conductivity with the flexure body by a non-conductive film pad 36. A passage 30, FIGS. 3 and 7, extends fully longitudinally through the body 12 between the end surfaces so that a force transmitting medium C, here shown as a rod-like cable or arm, for transmitting a tension or compression force can pass through the body 12 in unbroken or uninterrupted fashion. The medium C is can be any of a wire, cable, beam, rod, robotic arm, rope or the like capable of transmitting either or both of tension and compression forces for utilitarian purposes. The elasticity of the medium C is equal to or greater than that of the flexure body 12. FIG. 2 shows a slight variation in flexure body shape, also receiving a medium C therethrough.

Figure 5:
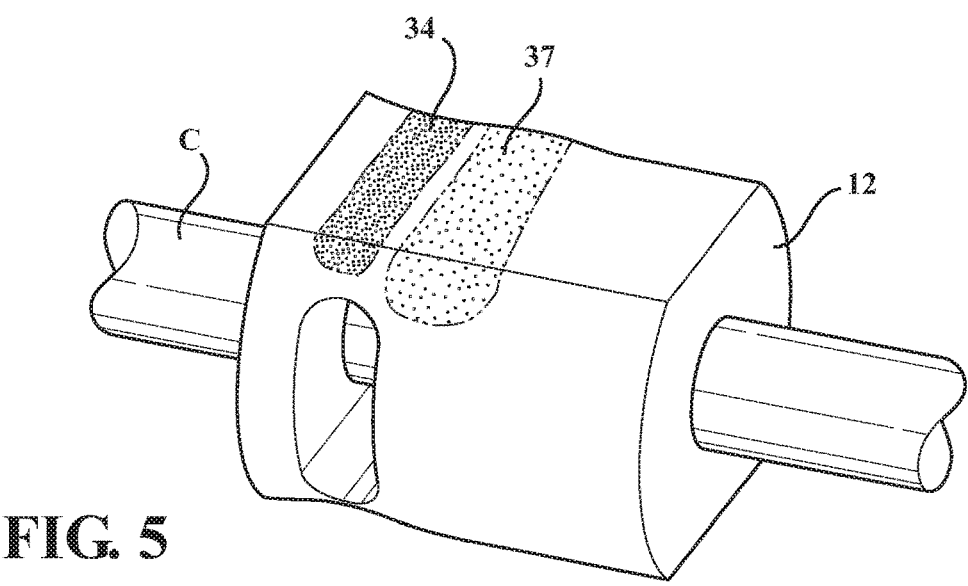
FIG. 5 is a view of the sensor body deformed in the strain-concentration area by a tension load in the attached medium showing areas 34 and 37 that are deformed in compression and tension modes, respectively.

A second aperture 32 extends laterally through the flexure body 12 between the curved sides 11, 13 and orthogonally intersects the longitudinal passage 30. As shown in FIG. 5, the effect of the aperture 32 is to define a stress-concentration area in the body, which area has portions 34 and 37 that deform in response to tension and/or compression loads to a greater dimensional degree than the rest of the body. The areas 34 and 37 on the top surface 18 of the body 12 are separately instrumented with foil strain gages to respond to compression and tension deformation respectively. Strain gages 38 and 40 are in the compression zone while gages 42 and 44 are in the tension zone. The strain gages 38, 40, 42, and 44 are bonded to an insulative film or coating 36 on the top surface 14 of the body directly over the stress concentration area created by hole 32, while the lead-connecting, solder pads 46 are to the right of the gages as seen in FIG. 1 where less deformation occurs. Piezoelectric devices or hall effect devices can be used but foil strain gages are preferred.

Figure 4:
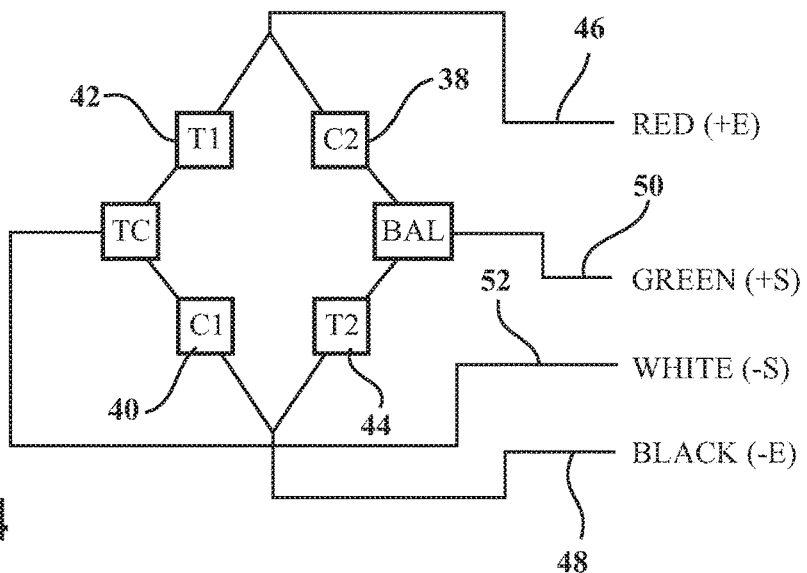
FIG. 4 is a Wheatsone bridge circuit for the strain gages in the embodiment of FIG. 1.

FIG. 4 shows a Wheatstone bridge circuit using the gages 38, 40, 42, and 44 as variable resistors in the legs of the bridge in conventional fashion. Leads 46 and 48 connect the bridge to a power supply (voltage source) while leads 50 and 52 are taken from the mid-points of the bridge to carry output signals to a display, signal processor or recorder when loads deform flexure body 12 and unbalance the bridge. The bridge circuit is "balanced" when no force changes the values of the resistor-gages, meaning that the voltage difference between the bridge mid-points is zero.

Alternative methods for mechanically attaching the ends of flexure body 12 to the cable medium C are illustrated in FIGS. 6-9. In FIGS. 6 and 7, only collar portions 53 and 55 are adhesively attached to cable medium C at constraining zones 18 and 20 as shown in FIG. 7.

Figure 8:
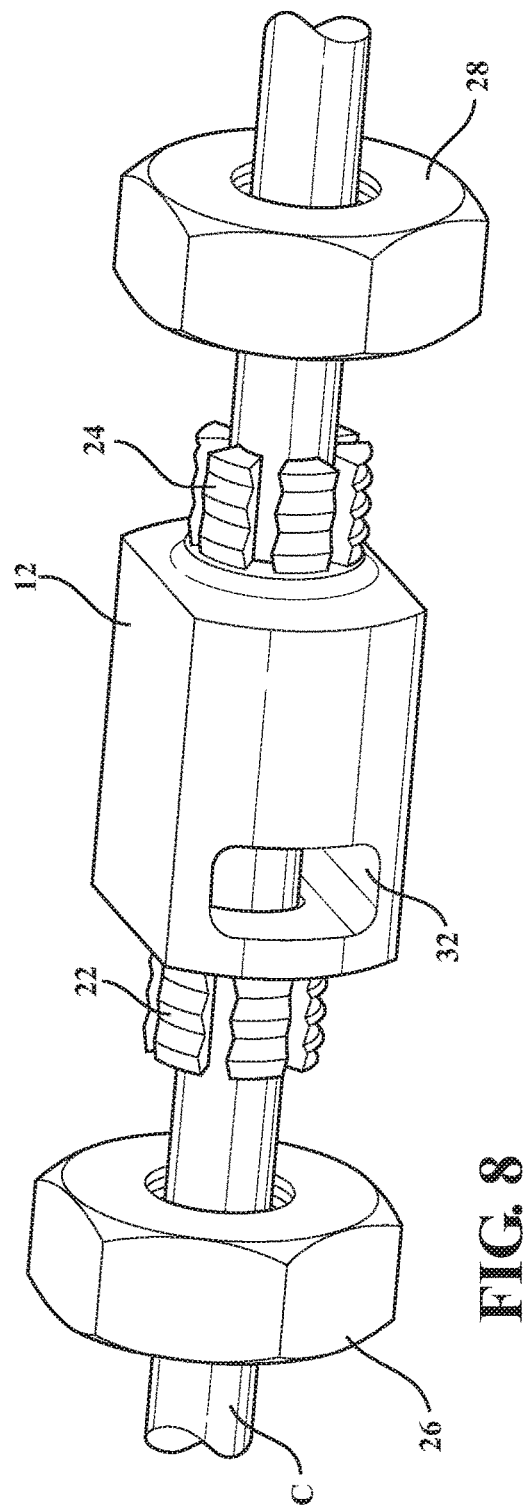
FIGS. 8 and 9 show a second mechanism for attaching the sensor body to a force-transmitting medium.
Figure 9:
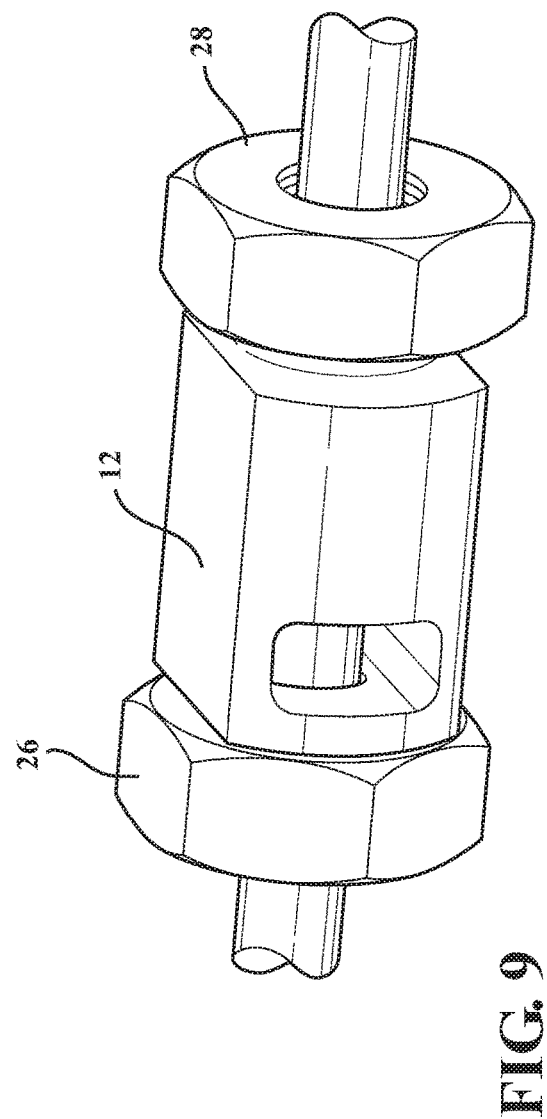

There is no mechanical connection between the flexure passage 30 and the medium C between these points and, in fact, a small radial clearance may exist between the cable medium C and the inside surface of passage 30. As an alternative, a clamping system as shown in FIGS. 8 and 9 can be employed. This system uses split collars 22, 24 threaded into the body 12 and clamp nuts 26 and 28 that are threaded into the collars to compress them, creating mechanical connection of the body 12 to medium C at end points.

Figure 10:
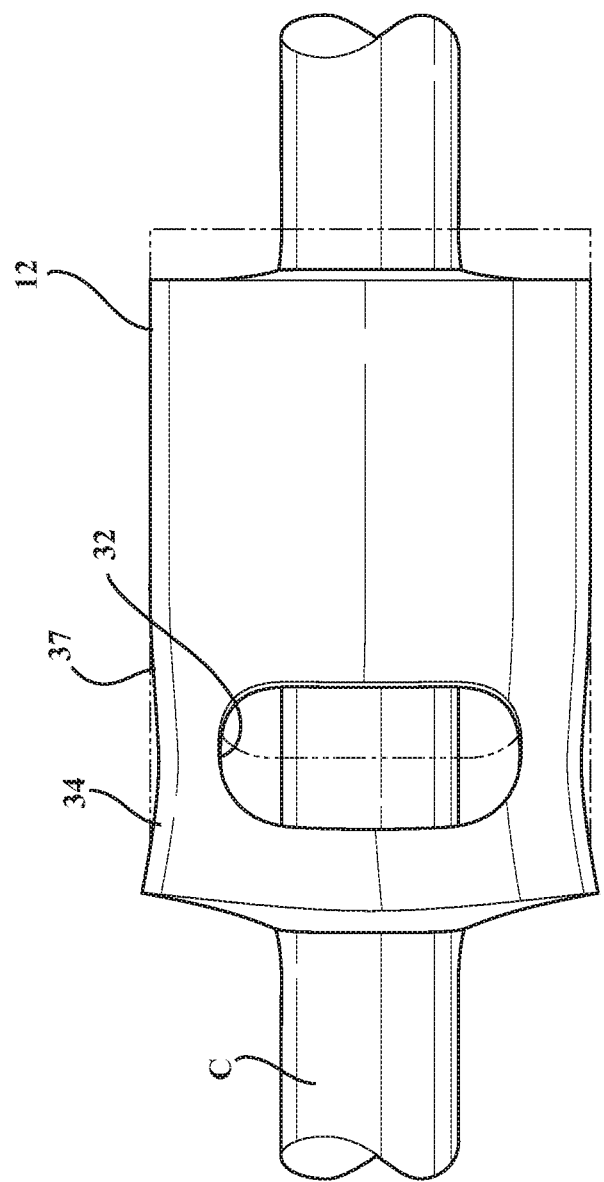
FIG. 10 shows the manner of deformation of the body in tension in detail.
Figure 12:
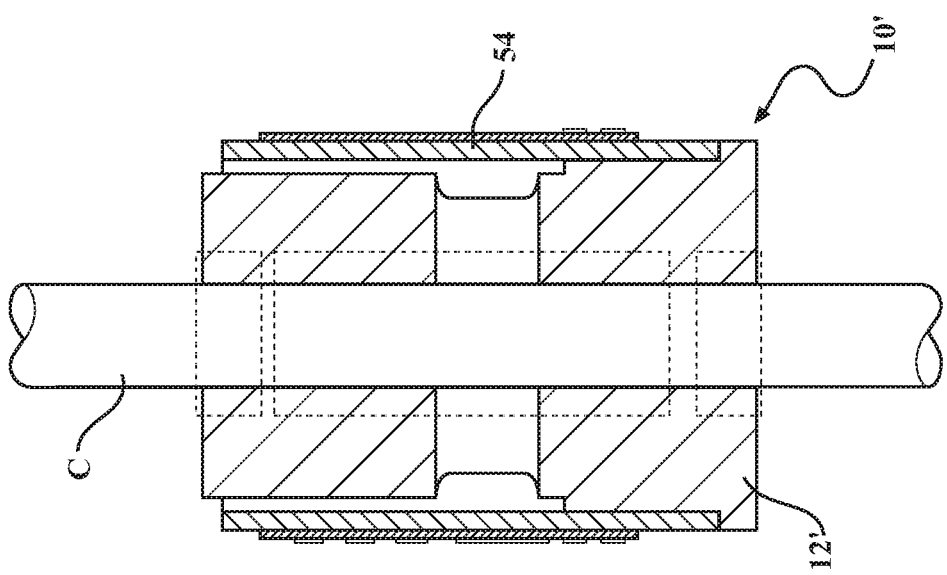
FIG. 12 is a side view in section of the sensor of FIG. 11 mounted to a medium C.

FIGS. 5 and 10 show in exaggerated fashion how sensor body 12 deforms in the stress concentration area when a tension or compression force is transmitted through medium C. Under tension, the area around the aperture 32 stretches and thins out, deforming the strain gages to change the resistance thereof to unbalance the bridge circuit of FIG. 4 and cause a voltage to appear across the mid-point leads 50,52 in conventional fashion. Persons familiar with Wheatstone bridge operation will understand that when the top two resistors are equal in R-value and the bottom two are also equal, or when all resistors 38, 40, 42, and 44 are equal in resistance value, the voltages at the midpoints are equal and the output on output leads 50 and 52 is zero; i.e., the bridge is "balanced." When, for example, the C resistors 38 and 40 increase in value, the bridge becomes "unbalanced" and a voltage appears across the output leads.

Guide Jacket Embodiments

Figure 3:
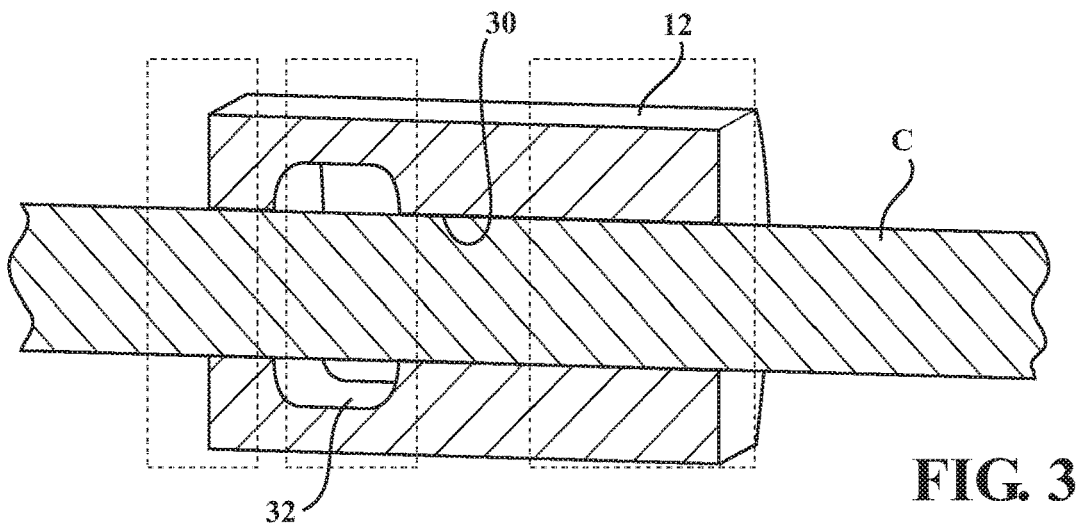
FIG. 3 is a sectional view of the flexure body 12 with a medium C extending through it.

FIGS. 11 through 22 show a sensor 10' with a flexure body 12' similar in physical shape and function to body 12 in FIGS. 1-3 but having an enclosure 54 of a material such as aluminum or plastic enclosing and welded or bonded to the flexure body 12' to prevent damage to the electrical connections necessary to attach leads to the pads 46 for bringing power into the bridge circuit and taking signals out therefrom. The flexure body 12' has the same functional relationship to the medium C as the embodiments of FIGS. 1-10. The enclosure 54 wraps around the flexure body in a direction orthogonal to the load axis and hugs the flexure body on the side surfaces but provides clearances that allow a flexible, insulative plastic film lead carrier 58 and the leads 62 bonded to it and to the solder pads 88 to wrap around the flexure body before being connected to a display or signal processor as desired. In this way, the connections are protected against accidental separation in the even of actions that put strain on the leads.

Figure 11:
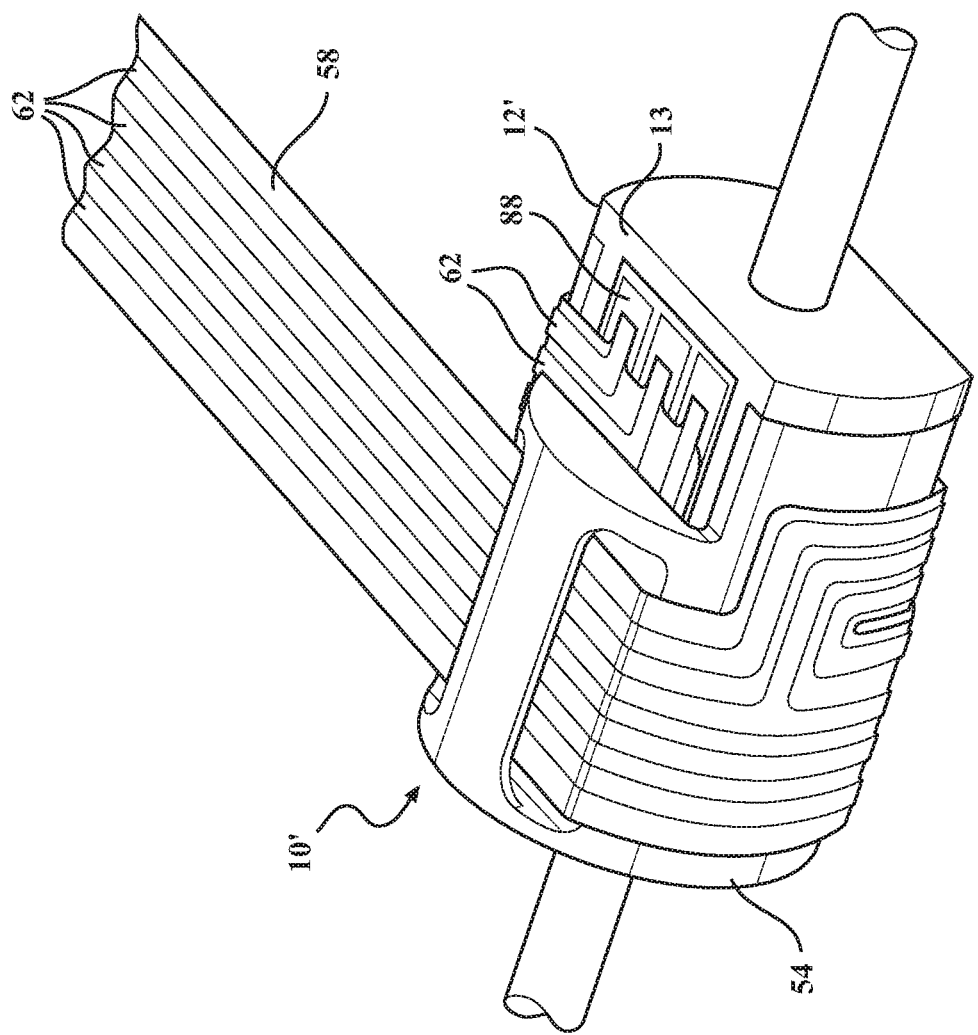
FIG. 11 shows a second embodiment in which the sensor body is enclosed or jacketed to receive a wrap-around polymetric carrier for leads to and from a double-sided bridge circuit.
Figure 17A:
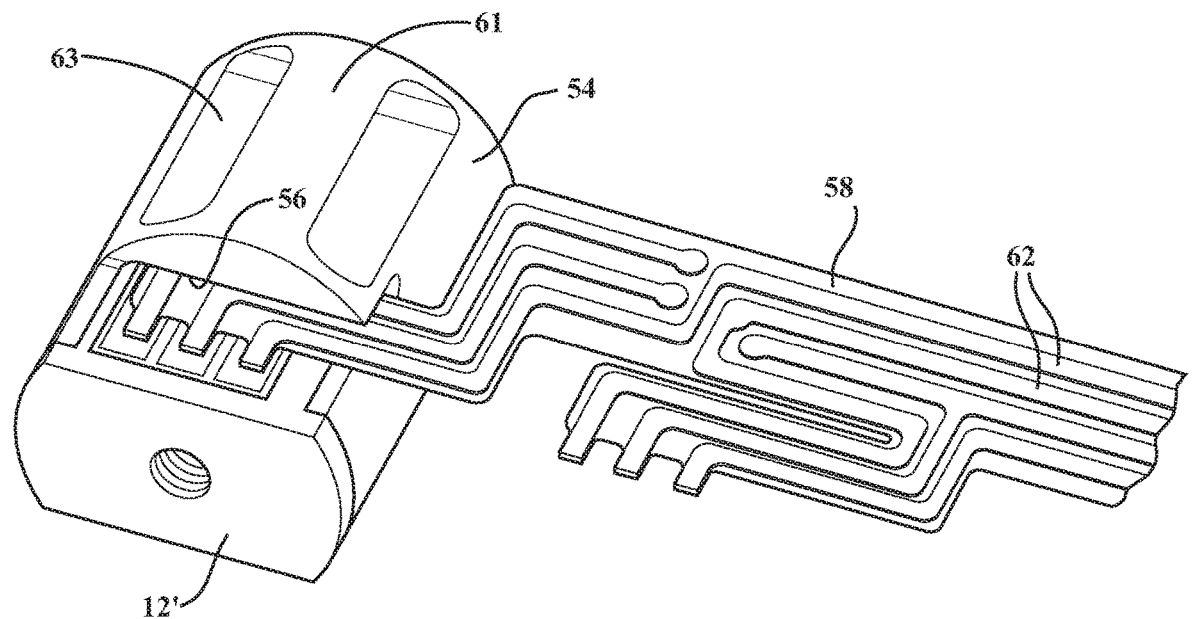
FIGS. 17A through 17D shows the steps for wrapping a lead carrier around the flexure body and enclosure in the double-sided embodiment of FIG. 12.
Figure 17B:
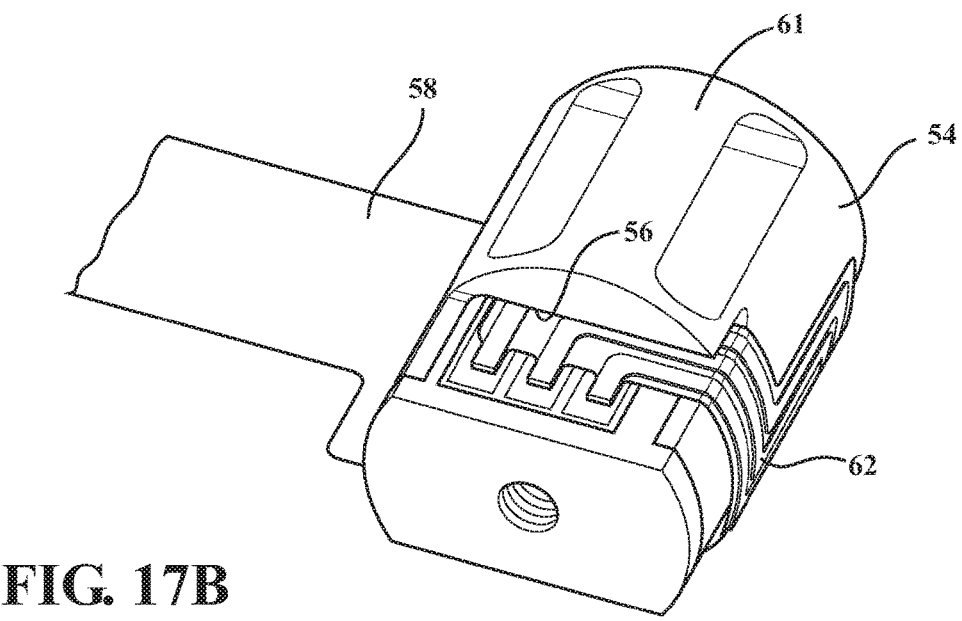
Figure 17C:
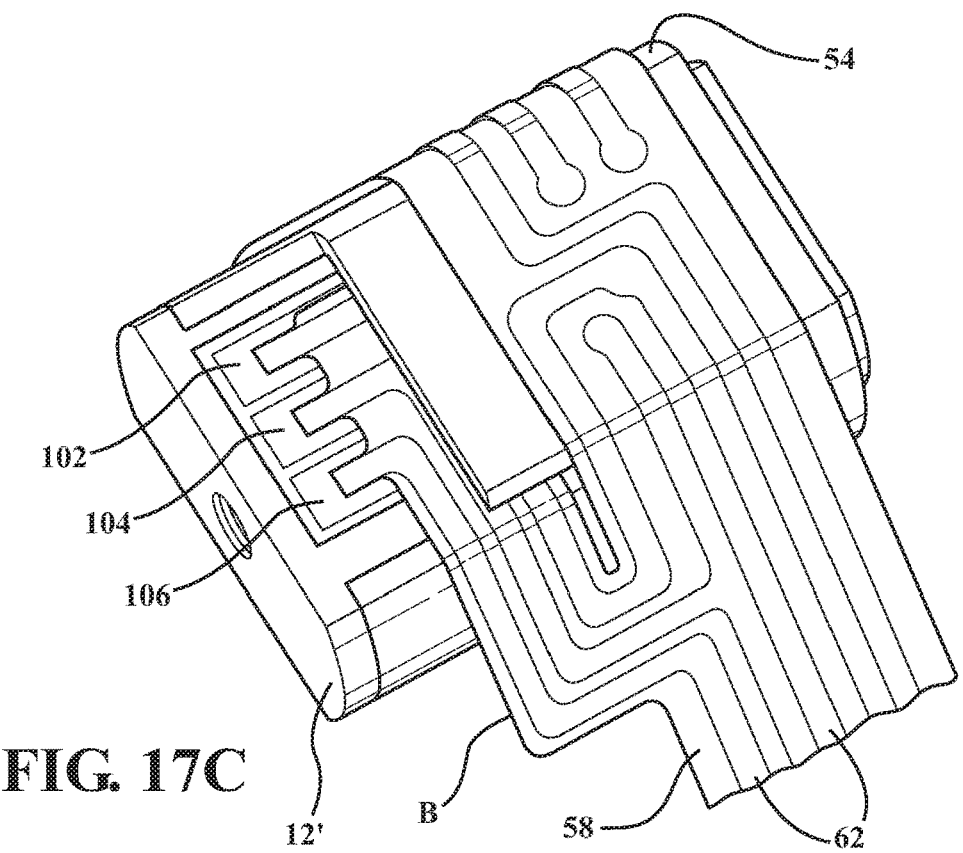
Figure 17D:
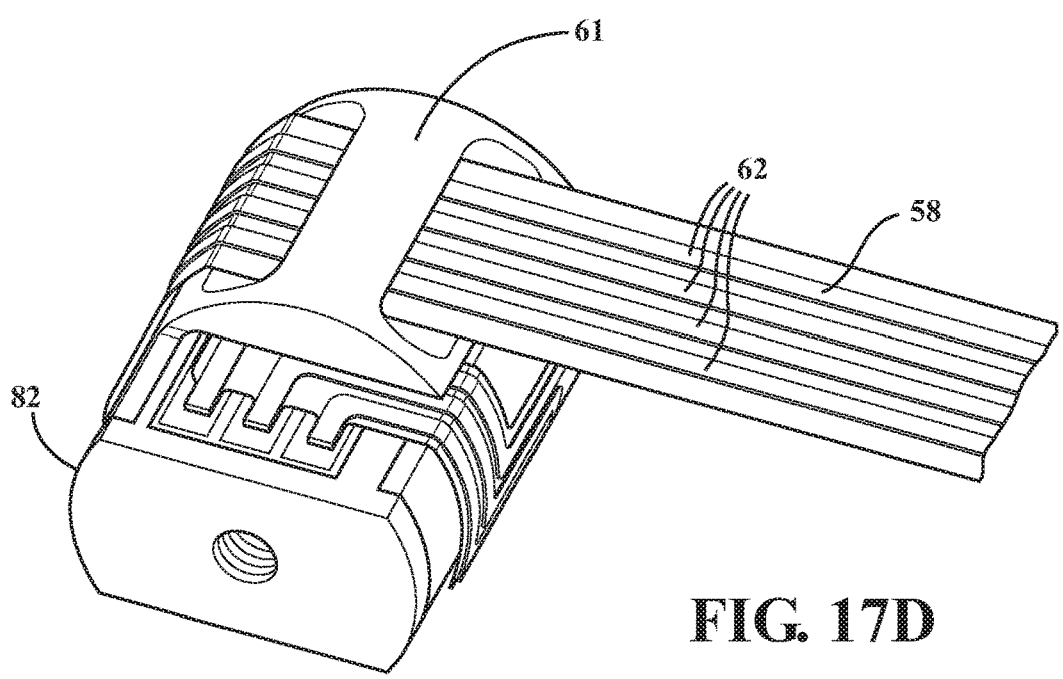

FIGS. 17A-17D, 18 and 19 show the enclosure 54 mounted on the modified flexure body 12'. The enclosure has an undersurface 56 that is raised above the top surface of the flexure body to provide clearance for the lead carrier 58 when wrapped around the flexure body. In addition, enclosure 54 has a top-side arch 61 that provides a passage 63 so the lead carrier 58 can pass over itself as it extends away from the flexure after wrapping around it as shown in FIGS. 11 and 17D. As presented, the enclosure consists of slot style strain relief for the flex cable both protecting it and deactivating influence of the cable movement onto the output stability of the sensor in, for example, rapid movement robotic application.

Referring now to FIGS. 13-22, the embodiments with the enclosure will be described in greater detail, showing the smaller, side flying finger access slots and main flex slotted strain relief.

Figure 13:
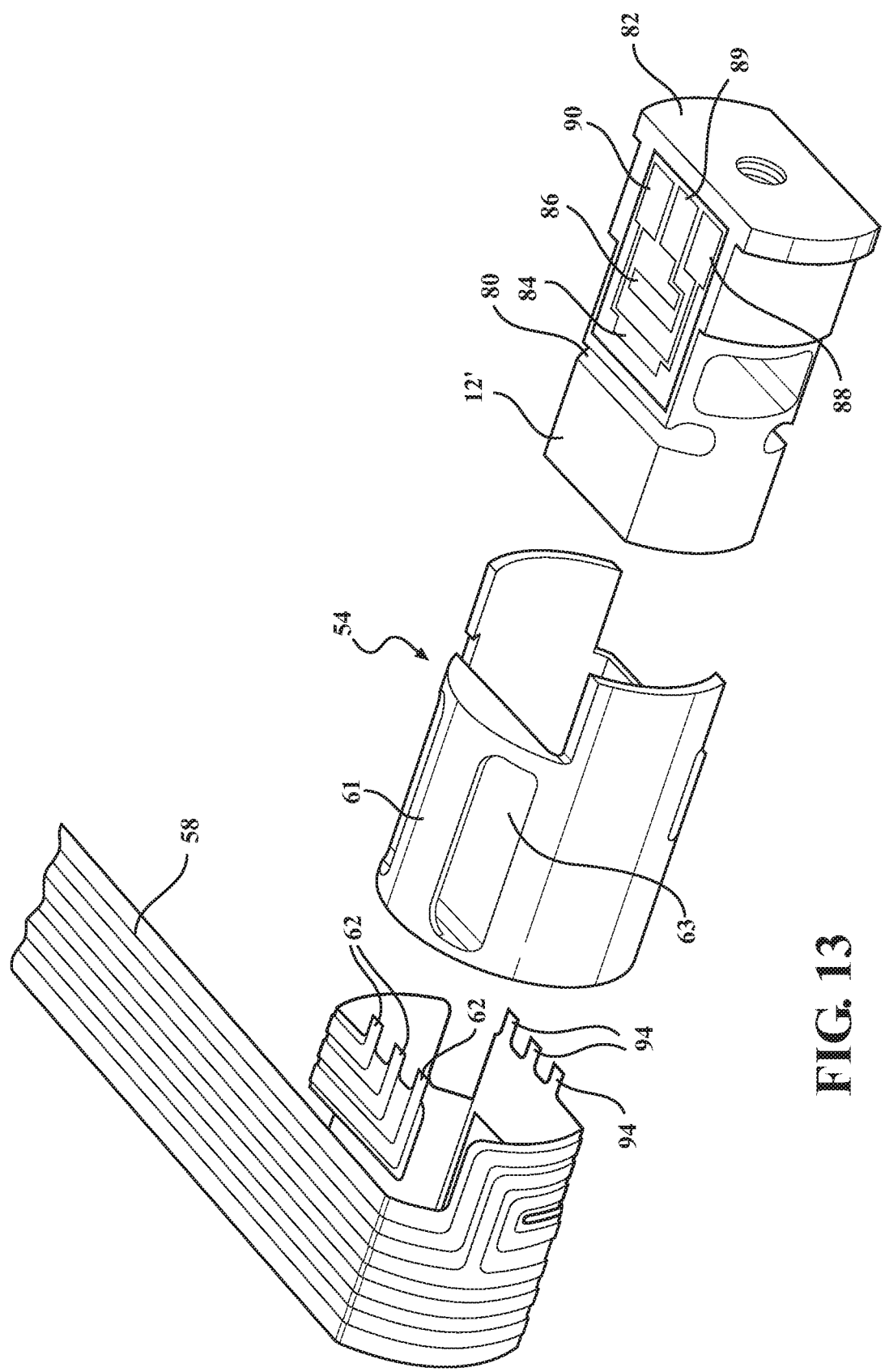
FIG. 13 is an exploded perspective of the principal parts of the embodiment of FIG. 12.

As shown in FIG. 13, the three main components of a double-sided, enclosed flexure are shown to comprise a flexure body 12', an enclosure 54 and a flexible plastic lead carrier 58 with leads 62 bonded to it in parallel fashion. Body 12' is similar to body 12 but has a strain-isolation cut 80 in the top surface and an end flange 82.

Figure 14:
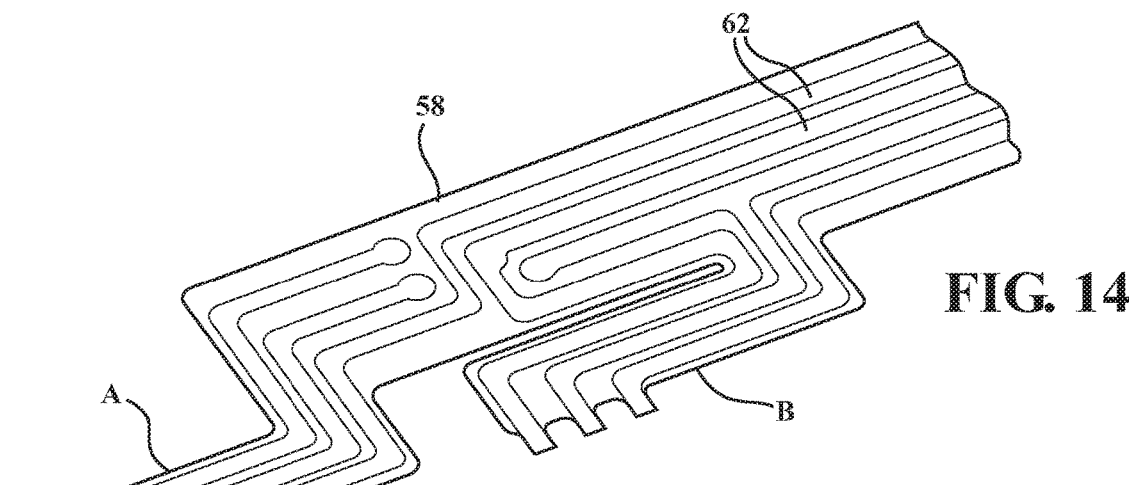
FIGS. 14 through 16 show layouts of the lead carrier for a double-sided bridge circuit in the embodiment of FIGS. 12-13 in developed and wrapped configurations.
Figure 15:
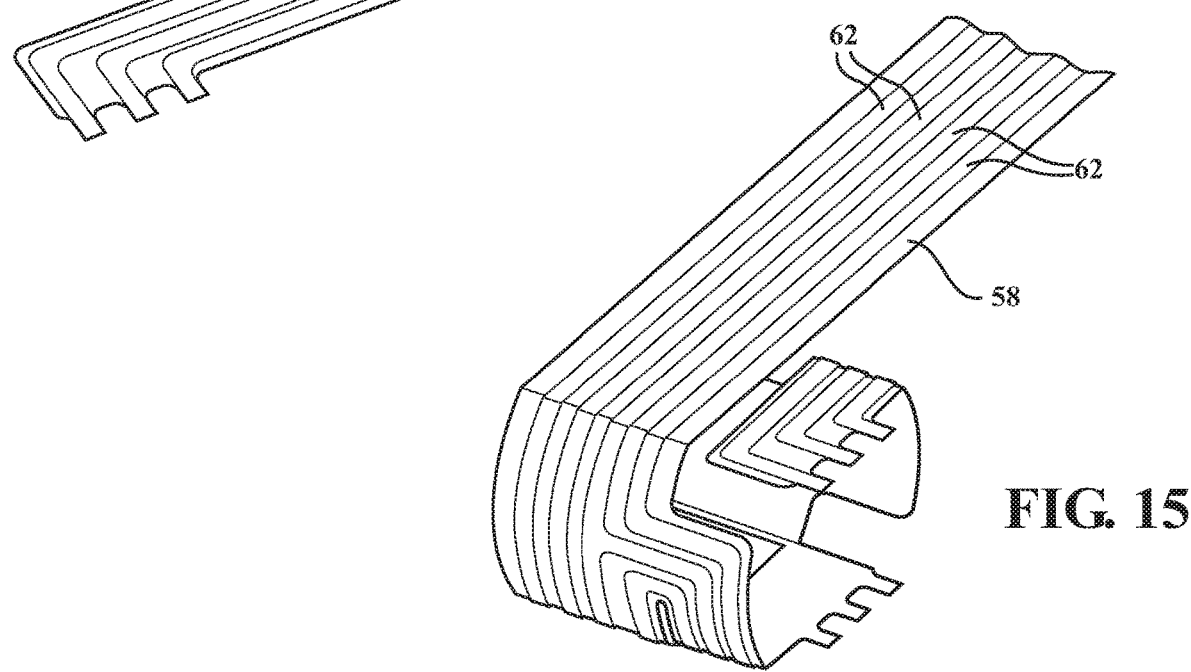
Figure 16:
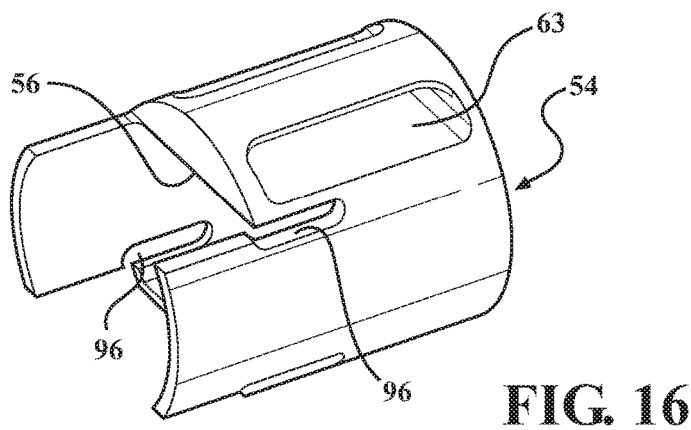
Figure 21:
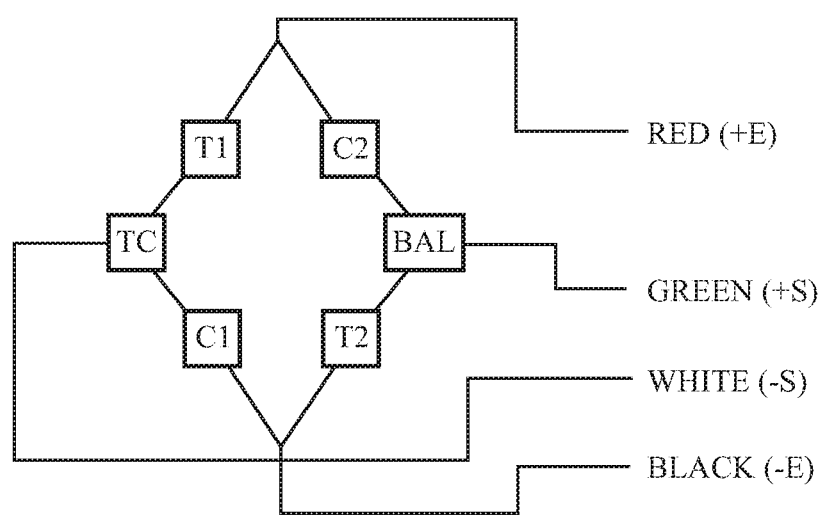
FIG. 21 shows a double-sided bridge circuit for the embodiment of FIGS. 12-20.

The body 12' in this embodiment is instrumented on both top and bottom surfaces (the "double-sided" bridge configuration), each surface carrying half of the strain gages that make up the bridge circuit shown in FIG. 21, as well as the solder pads acting as connector location for leads to and from the bridge circuit strain gages. In FIG. 13, the top-side strain gages are 84 and 86 while the solder pads are 88, 89, and 90. The other two strain gages are on the bottom surface of body 12' at the locations indicated by the lead tabs on the bottom of FIG. 15. The carrier 58 is configured as shown in FIGS. 14 and 15 as an elongate body of insulative flexible film with legs A and B providing support surfaces for leads 62 to the top and bottom solder pads.

The enclosure 54 fits like a jacket onto the body 12' with the near ends abutting the flange 82 as shown in FIG. 17D. The lead carrier 58 is wrapped around and adhered to the enclosure 54 and the tabs 92, 94 are soldered to the pads 88, 89, and 90 on the top of flexure body 12'. Three more pads 102, 104, 106 are located on the bottom flat surface as will be apparent in FIG. 17C and the leads 62 on leg B are soldered to them. FIG. 14 shows the flat layout of the leads while FIGS. 13 and 15 show the flexible carrier 58 re-shaped to conformingly wrap around the body 10' more than 360°; i.e., the carrier must pass therefore over itself as it extends away from the flexure. A finger slot 96 in the enclosure provides clearance for the carrier as it leaves the pads on the top side as shown in FIGS. 15, 16, 17A, and 17B, while opening 63 provides a passage for the fully-wrapped and adhered film carrier 58 to reach a display, signal processor or recorder (not shown). The enclosure does not alter the performance of the flexure body, specifically on the stress concentration area.

FIG. 17C shows the bottom of the flexure 12' with the enclosure 54 wrapped around it. The three leads 62 are soldered to pads 102, 104, and 106 on the bottom flat surface of body 12'. FIG. 17D shows the top side of the flexure 12' and the enclosure 54 with the arch 61.

Figure 18:
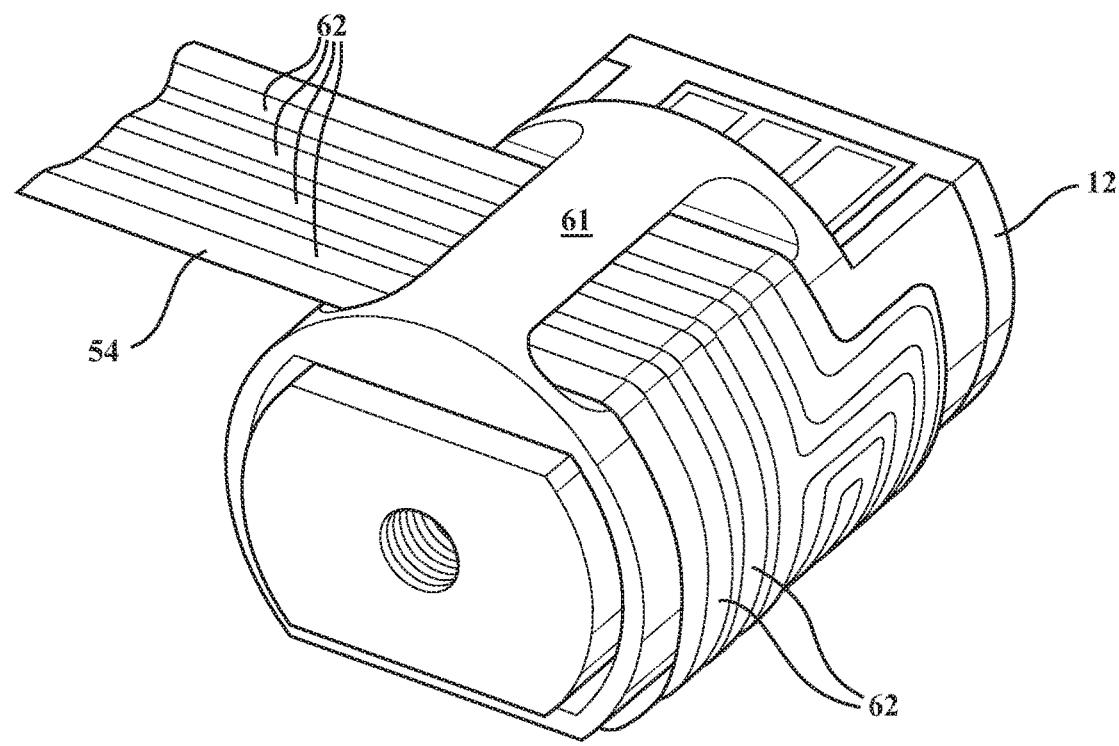
FIGS. 18 and 19 show details of the lead carrier and enclosure with the wrapped lead carrier from two different perspectives.
Figure 19:
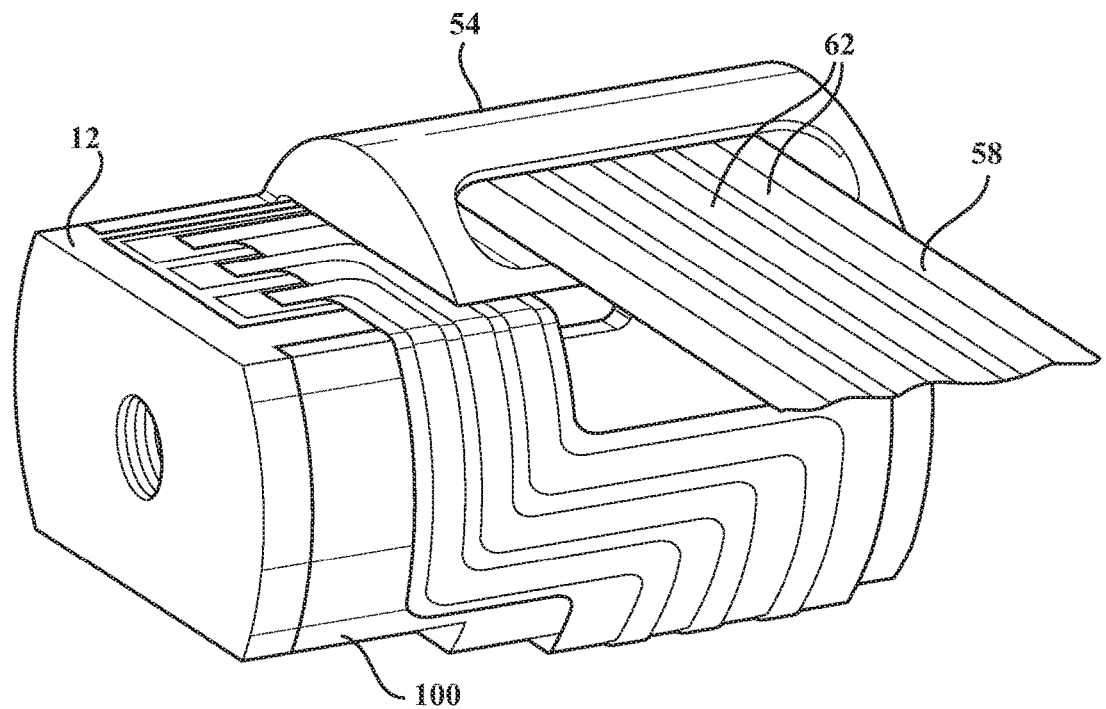

FIGS. 18 and 19 show the entire sensor assembly from two angles. FIG. 19 shows the zone 100 where the enclosure is bonded to the flexure body 12'; this zone being essentially non-deflecting when the sensor is under load.

Figure 20A:
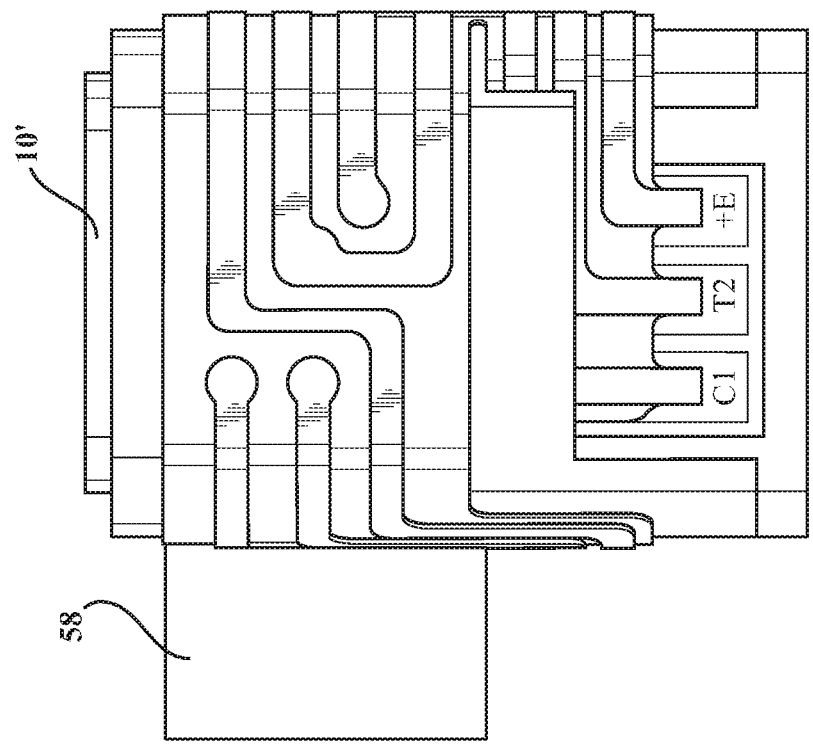
FIGS. 20A through 20C show additional details of the lead carrier attachment scheme.
Figure 20B:
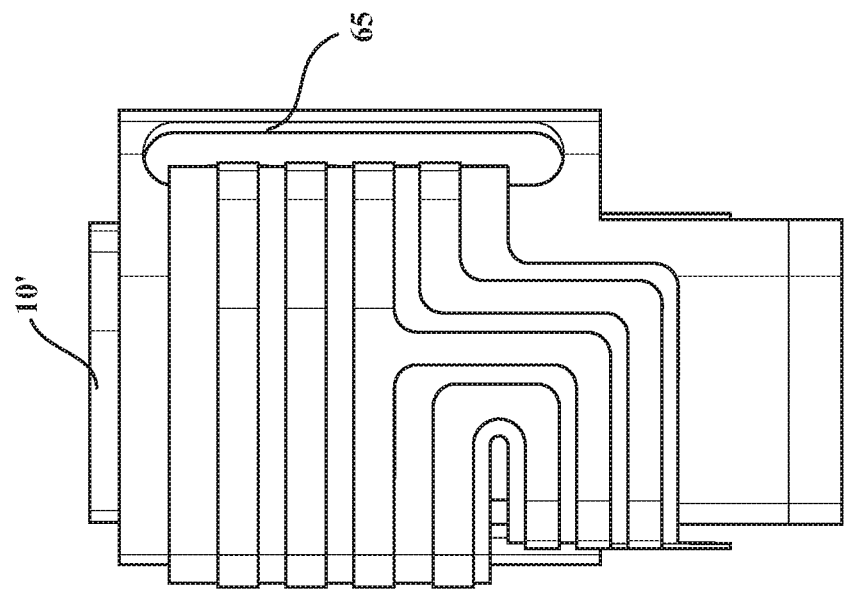
Figure 20C:
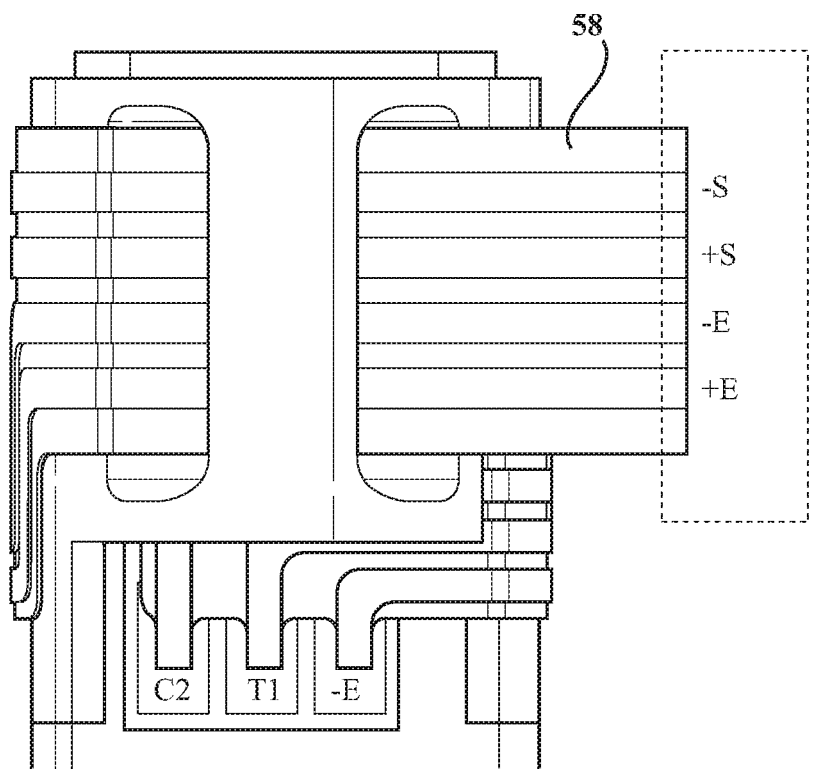

FIGS. 20A through 20C show the completed assembly from bottom, side and top views, respectively and identify the bridge elements by C and T letters representing compression and tension. The voltage lead is identified by +E.

FIG. 21 shows the double-sided strain gages connected into a bridge circuit.

Figure 22:
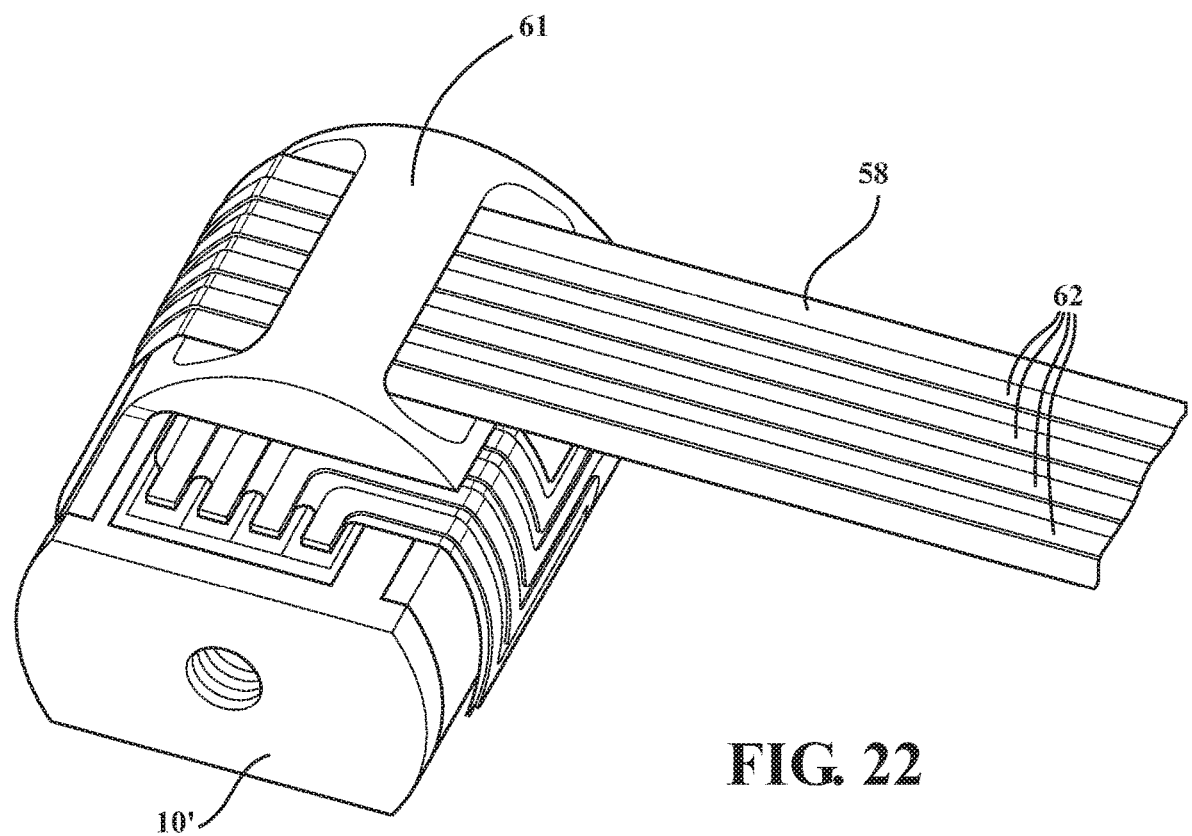
FIG. 22 allows a single-sided bridge circuit for the jacketed embodiment.

FIG. 22 shows how the sensor 10' with enclosure 54 can be instrumented in single-sided fashion; i.e., with all four gages on the top surface, similar to what is shown in the unjacketed embodiment of FIG. 1. Again, the carrier 58 wraps around the enclosure and passes out under the arch 61.

Operation

Operating the device as installed on a cable, wire, rod or other appropriate force transmitting medium will now be described. In this instance, the device is on the order of 5 mm in length and is capable of tolerating up to about 150 pounds of tension force. Accordingly, the Young's modulus of elasticity of the body is about $28 \times 10^6$ psi to $29 \times 10^6$ psi. A voltage source or convenient power level is connected between leads 46 and 48 of the Wheatstone bridge voltage resulting from an unbalanced condition of the bridge representing transmitted force is taken across the leads 50 and 52. After suitable calibration, the signals are correlated to transmitted force to a high degree of accuracy.

It will be appreciated that the dimensions and other numbers given herein are representative in nature and are not to be construed in a limiting sense unless otherwise indicated. It will be further understood that the body 12 made be instrumented in various ways; for example, it may be implemented with a full bridge on one side as shown in FIGS. 1 and 22, or a double-sided circuit with two half bridge gages on each side as shown in FIGS. 11 and 12-21.

What is claimed is:

1. A load sensor for attachment in surrounding relationship to a linear load transmission medium, said linear load transmission medium consisting of one of a wire, a cable, or a rod, comprising:
   a solid flexure body of high modulus of elasticity material having a longitudinal axis,
   a circumferential outer surface having opposite ends and a passage extending fully through the body along the longitudinal axis and between said ends;
   said circumferential outer surface having rounded sides and opposite planar surface portions;
   said body having a lateral aperture extending through the body and intersecting the longitudinal passage;
   said body further having lateral slots extending across said planar surface portions in parallel with said lateral aperture to create stress concentration areas in said circumferential outer surface;
   said body having strain sensing elements mounted on at least one of said planar surface portions proximate said concentration areas to produce electrical signals representing forces transmitted trough said medium and transferred to said flexure body;
   means for mechanically connecting said body to said medium only at points proximate said ends;
   an insulative and flexible lead carrier film attached to said body and extending from said outer surface portion circumferentially fully around said body at right angles to said longitudinal axis; and
   conductive leads attached to said strain sensing elements and bonded to said lead carrier film so as to extend fully around the circumferential outer surface of said body.

2. The load sensor defined in claim 1 further including a jacket having an outer circumferential surface and an inner circumferential surface, said jacket being applied with said inner circumferential surface in contact and in surrounding relationship with said outer circumferential surface of said flexure body to cover a majority of said body outer circumferential surface; said jacket forming a space between the inner circumferential surface of said jacket and said strain sensing elements to allow space for said lead carrier to extend circumferentially out from under the jacket and thereafter wrap fully circumferentially around the outer circumferential surface of the jacket.

3. The load sensor as defined in claim 2 wherein the jacket has an arch formed thereon over said outer surface portion and creating a passage, the lead carrier, after extending around said body, passing through said arch passage and away from said body.

4. The load sensor as defined in claim 1 wherein said flexure body is approximately 5 mm in longitudinal dimension.

5. The load sensor as defined in claim 1 further including strain sensing elements mounted on both of said planar surface portions and joined into a bridge circuit by leads extending from said elements on to said lead carrier.

6. The load sensor as defined in claim 1 wherein said flexure body has integral tubular axial extensions co aligned with said passage; said means for connecting the flexure body to said medium including compression of said tubular extensions.

\* \* \* \* \*